United States Patent
An et al.

(10) Patent No.: US 7,973,727 B2
(45) Date of Patent: Jul. 5, 2011

(54) MOBILE COMMUNICATION TERMINAL

(75) Inventors: Chan Gwang An, Gyunggi-Do (KR); Jae Suk Sung, Gyunggi-Do (KR); Sung Eun Cho, Gyunggi-Do (KR); Ha Ryong Hong, Gyunggi-Do (KR); Hyun Kil Nam, Seoul (KR); Ki Won Chang, Gyunggi-Do (KR); Dae Seong Jeon, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 350 days.

(21) Appl. No.: 12/243,697

(22) Filed: Oct. 1, 2008

(65) Prior Publication Data

US 2009/0295649 A1    Dec. 3, 2009

(30) Foreign Application Priority Data

May 27, 2008   (KR) .................. 10-2008-0049044

(51) Int. Cl.
*H01Q 1/24* (2006.01)
(52) U.S. Cl. ....................... 343/702; 343/873
(58) Field of Classification Search .......... 343/702, 343/700 MS, 872, 873, 906

See application file for complete search history.

(56) References Cited

U.S. PATENT DOCUMENTS

| | | | |
|---|---|---|---|
| 5,258,892 A | 11/1993 | Stanton | |
| 7,339,533 B2 * | 3/2008 | Kurashima et al. | 343/702 |
| 7,570,218 B2 * | 8/2009 | Tsujimura et al. | 343/702 |

FOREIGN PATENT DOCUMENTS

| | | |
|---|---|---|
| JP | 2002-329541 A | 11/2002 |
| JP | 2004-328108 A | 11/2004 |
| KR | 200356488 Y1 | 7/2004 |
| KR | 1020080008633 A | 1/2008 |

OTHER PUBLICATIONS

Korean Office action for application No. 10-20080049044, issued Apr. 5, 2010.

* cited by examiner

*Primary Examiner* — Hoang V Nguyen
(74) *Attorney, Agent, or Firm* — Lowe, Hauptman, Ham & Berner, LLP

(57) ABSTRACT

There is provided a mobile communication terminal including: a housing of the mobile communication terminal; a film type antenna provided on the surface of the housing; a printed circuit board disposed inside the housing; and a connector electrically connecting the film type antenna and the printed circuit board.

15 Claims, 2 Drawing Sheets

MOBILE COMMUNICATION TERMINAL

CROSS-REFERENCE TO RELATED APPLICATIONS

This application claims the priority of Korean Patent Application No. 2008-0049044 filed on May 27, 2008, in the Korean Intellectual Property Office, the disclosure of which is incorporated herein by reference.

BACKGROUND OF THE INVENTION

1. Field of the Invention

The present invention relates to mobile communication terminals, and more particularly, to a mobile communication terminal that can provide a stable contact between a film type antenna formed on a housing of the mobile communication terminal and a printed circuit board inside the housing.

2. Description of the Related Art

Recently, mobile wireless terminals that separately use various kinds of bandwidths, such as CDMA, PDA, DCS, and GSM, or use all of the bandwidths, have come into widespread use. Terminals that have various kinds of functions and designs have appeared. As the terminals have gradually been reduced in size, thickness, and weight, the diversity of the functions of the terminals has attracted attention. Therefore, emphasis is placed on reducing the volume of the terminals while the terminals maintain the function of an antenna.

Particularly, in a case of an antenna, for example, a rod antenna or a helical antenna that protrudes from the outside of a terminal by a predetermined length has excellent characteristics because of omnidirectional radiation. However, the rod antenna or the helical antenna of the terminal is most susceptible to damage when it falls down, and reduces portability. Therefore, research has been conducted on an in-molding antenna that is formed integrally with a case of a mobile communication terminal.

SUMMARY OF THE INVENTION

An aspect of the present invention provides a mobile communication terminal that can provide a stable contact between a film type antenna formed on a housing of the mobile communication terminal and a printed circuit board inside the housing.

An aspect of the present invention also provides a mobile communication terminal including: a housing of the mobile communication terminal; a film type antenna provided on the surface of the housing; a printed circuit board disposed inside the housing; and a connector electrically connecting the film type antenna and the printed circuit board.

The film type antenna may be provided integrally with the housing by in-molding labeling.

The connector may be provided by in-molding labeling while part of the connection is inserted into the housing.

The connector may include a first contact part in contact with the film type antenna; a second contact part connected to the printed circuit board; and a support part provided between the first contact part and the second contact part and supporting the connector with respect to the housing.

The first contact part may include a bent portion to provide elasticity.

The second contact part may pass through a via hole formed in the printed circuit board, and be connected to one surface of the printed circuit board opposite to another surface facing the film type antenna by soldering.

The support part may include: a first support portion connecting the first contact part and the second contact part; and a second support portion extending from the first support portion.

The first support portion may be perpendicular to a major surface of the printed circuit board.

The second support portion may be horizontal to the major surface of the printed circuit board.

The housing may include a protrusion to support the support part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
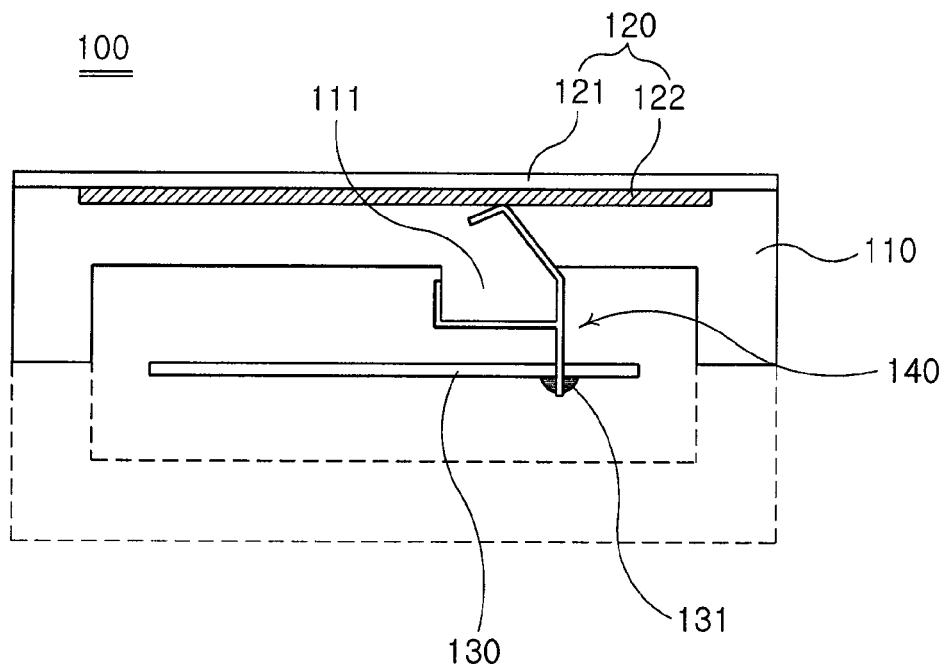
FIG. 1 is a cross-sectional view illustrating a mobile communication terminal according to an exemplary embodiment of the invention.

FIG. 1 is a cross-sectional view illustrating a mobile communication terminal according to an exemplary embodiment of the invention.

Referring to FIG. 1, a mobile communication terminal 100 according to this embodiment may include a housing 110, a film type antenna 120, a printed circuit board 130, and a connector 140.

The film type antenna 120 may include a carrier film 121 and a conductive pattern 122.

The carrier film 121 may be formed of a material that is appropriate to perform in-molding labeling (IML). Specifically, the carrier film 121 that has the conductive pattern 122 formed on one surface thereof is inserted into a mold for manufacturing the housing of the mobile communication terminal, synthetic resins used to form the housing of the mobile communication terminal are injected into the mold, and the housing is manufactured from the synthetic resins at the appropriate temperature and pressure. Therefore, the material that forms the carrier film 121 needs to be a material that does not significant deformation under the pressure and temperature during the in-molding labeling, and at the same time, can be formed integrally with the housing of the mobile communication terminal. In this embodiment, the carrier film 121 may include a thin, insulating polymer material.

The conductive pattern 122 may be an antenna pattern that is formed on one surface of the carrier film 121.

The conductive pattern 122 may be formed by using various kinds of methods. A conductive pattern may be printed onto the carrier film 121 by using conductive ink. Alternatively, a desired pattern may be directly formed on the carrier film by sputtering or evaporation. The conductive pattern 122 may be a conductive pattern that is formed of previously manufactured metal foil that is then attached to the carrier film 121.

The conductive pattern 122 includes a power feed terminal, and may also include a connection terminal for making a connection with an external circuit, such as a ground terminal. In this embodiment, the power feed terminal may be a contact area that is in contact with an external power feed line.

The housing 110 of the mobile communication terminal may be formed by the in-molding labeling. That is, the carrier film on which the conductive pattern is formed is inserted into the mold, synthetic resins used to form the housing are injected into the mold, thereby manufacturing the housing. In this embodiment, the carrier film 121 may be formed integrally with the housing 110 and be formed on the surface of the housing.

In this embodiment, the carrier film 121 may be formed on an outer surface of the housing 110. The conductive pattern 122 may be located between the housing 110 and the carrier film 121.

The housing may vary in shape. In this embodiment, a protrusion 111 may be formed on the inside of the housing 110 in order to support the connector 140. The shape or position of the protrusion may vary according to the shape or position of the connector.

The printed circuit board 130 may be disposed inside the housing of the mobile communication terminal. A plurality of active devices and passive devices may be mounted on the printed circuit board 130. A power feed line for supplying a current to the film type antenna 120 may be formed on the printed circuit board.

In this embodiment, a via hole may be formed in the printed circuit board 130. One end of the connector 140 may be arranged and pass through the via hole. The end of the connector may be connected to the power feed line by soldering, which is performed at one surface opposite to another surface, which faces the film type antenna, from major surfaces of the printed circuit board.

The connector 140 may connect the film type antenna 120 to the printed circuit board 130. That is, one end of the connector 140 may be in contact with the conductive pattern 122 of the film type antenna that is formed on the surface of the housing of the mobile communication terminal, and the other end of the connector 140 may be in contact with the power feed line of the printed circuit board 130 that is disposed inside the housing of the mobile communication terminal.

In this embodiment, the connector 140 may be formed integrally with the housing 110 of the mobile communication terminal. The housing 110 may be manufactured by using in-molding labeling. That is, during the in-molding labeling, the connector may be injected into the mold for manufacturing the housing, and synthetic resins used to form the housing may be injected into the mold, thereby manufacturing the housing. At this time, the connector 140 may be formed integrally with the housing 110 while part of the connector is inserted into the housing.

In this embodiment, the other end of the connector may pass through the via hole formed in the printed circuit board, and be connected to the rear surface of the printed circuit board by soldering. That is, the connector is not connected to the surface facing the film type antenna among the major surfaces of the printed circuit board, but a soldering portion 131 is formed at the surface that is opposite to the surface facing the film type antenna, so that the adhesion between the printed circuit board 130 and the connector 140 can be strengthened.

Figure 2:
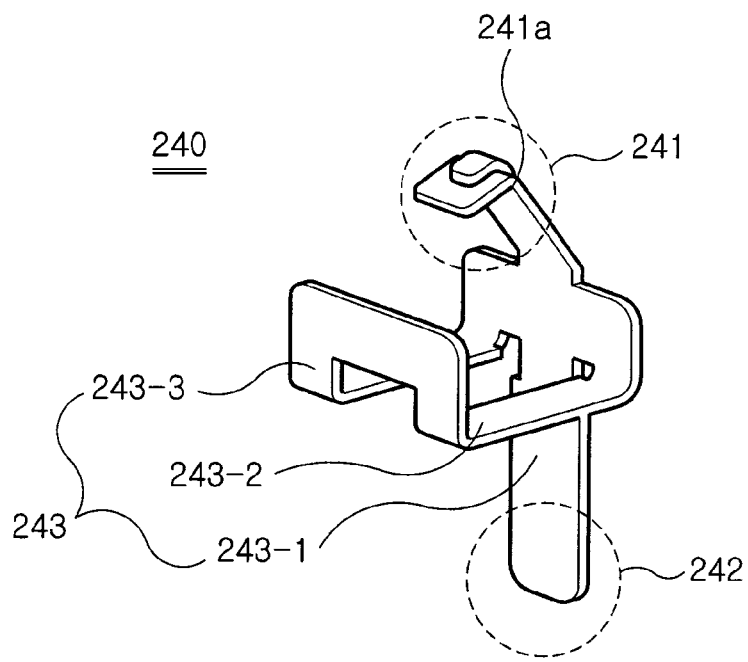
FIG. 2 is a perspective view illustrating a connector used in a mobile communication terminal according to another exemplary embodiment of the invention.

FIG. 2 is a perspective view illustrating a connector that is used in a mobile communication terminal according to another embodiment of the invention.

A connector 240 according to this embodiment may include a first contact part 241, a second contact part 242, and a support part 243.

The first contact part 241 may be in contact with a conductive pattern of a film type antenna that is formed on a housing of a mobile communication terminal.

At least one bent portion 241*a* may be formed at the first contact part 241. The bent portion 241*a* provides predetermined elasticity to the first contact part. The predetermined elasticity of the first contact part 241 can prevent an undesired deformation of the film type antenna caused by the first contact part 241 when the first contact part 241 is in contact with the film type antenna.

The second contact part 242 may be connected to the printed circuit board that is disposed inside the housing of the mobile communication terminal. The second contact part 242 may be electrically connected to a power feed line, formed on the printed circuit board, by soldering. The connector may be fixed to the printed circuit board by the soldering. In this embodiment, the second contact part 242 may be connected to the rear surface of the printed circuit board. Therefore, the second contact part 242 may pass through the via hole that is formed in the printed circuit board.

The support part 243 may be formed between the first contact part 241 and the second contact part 242, and support the connector with respect to the housing of the mobile communication terminal.

In this embodiment, the support part 243 may include a first support portion 243-1, a second support portion 243-2, and a third support portion 243-3. The first support portion 243-1 may directly connect the first contact part 241 and the second contact part 242 to each other. When the connector is disposed inside the housing of the mobile communication terminal, the first support portion 243-1 may be disposed perpendicular to the major surface of the printed circuit board to which the connector is connected.

The second support portion 243-2 may extend from the first support portion 243-1. The second support portion 243-2 may be perpendicularly connected to the first support portion 243-1. In this case, when the connector is disposed inside the housing of the mobile communication terminal, the second support portion 243-2 may be disposed in parallel with the major surface of the printed circuit board to which the connector is connected.

The third support portion 243-3 may extend from the second support portion 243-2. The third support portion 243-3 may be perpendicularly connected to the second support portion 243-2.

In this embodiment, the first support portion 243-1, the second support portion 243-2, and the third support portion 243-3 are tightly disposed to part of the housing of the mobile communication terminal to which the connector is coupled, and thus can firmly support the connector. In order to more firmly support the first to third support parts, a protrusion may be formed inside the mobile communication terminal.

Figure 3A:
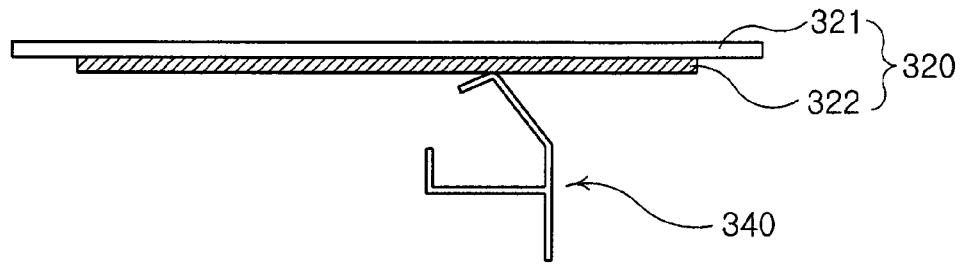
FIGS. 3A to 3C are cross-sectional views illustrating the process flow to manufacture a mobile communication terminal according to still another exemplary embodiment of the invention.
Figure 3B:
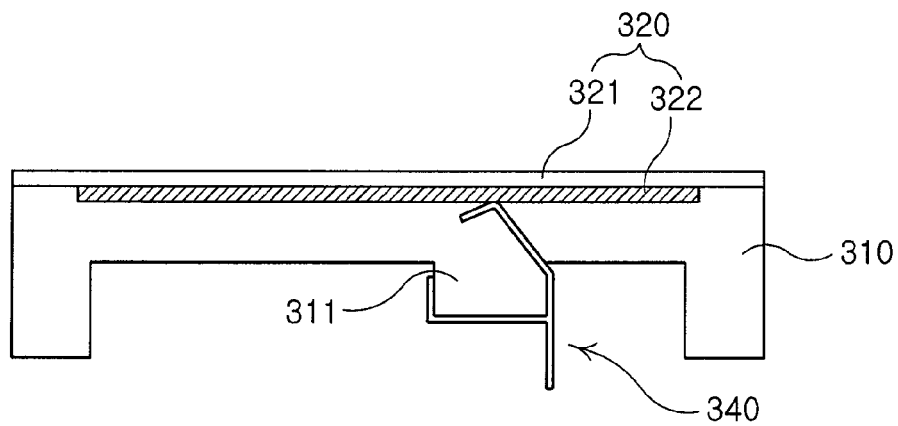
Figure 3C:
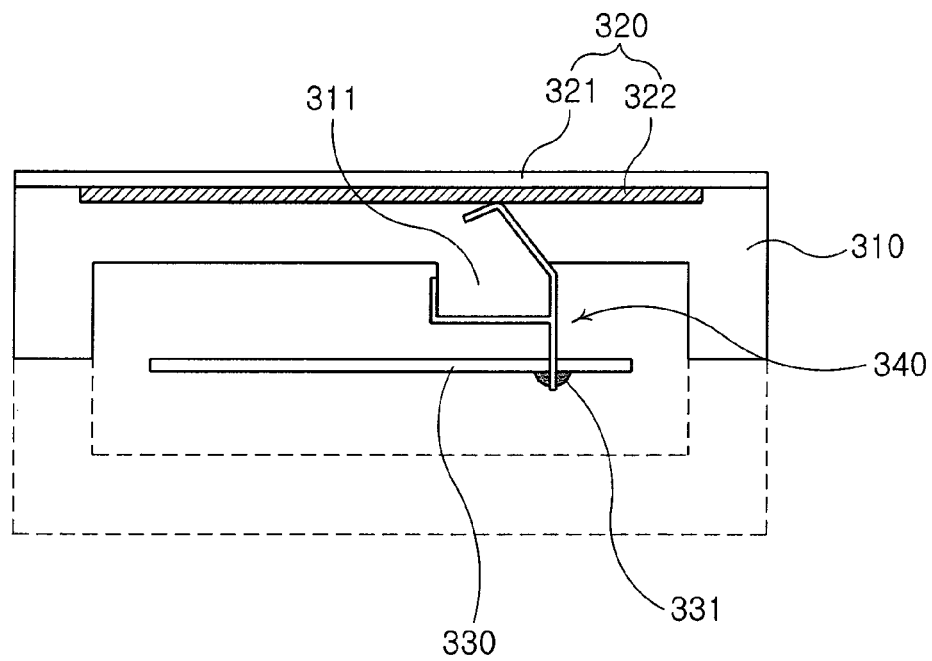

FIGS. 3A to 3C are cross-sectional views illustrating the process flow to manufacture a mobile communication terminal according to still another exemplary embodiment of the invention.

FIG. 3A is a view illustrating a process of positioning a film type antenna and a connector inside a mold having the shape of a housing of a mobile communication terminal in order to perform in-molding labeling. In FIG. 3A, the specific shape of the mold is omitted.

A film type antenna 320 includes a carrier film 321 and a conductive pattern 322 that may be formed on the carrier film 321. The carrier film 321 may be formed of a material that is appropriate to perform in-molding labeling (IML). Specifically, the carrier film 321 that has one surface at which the conductive pattern 322 is formed is inserted into a mold for manufacturing the housing of the mobile communication terminal, synthetic resins used to form the housing of the mobile communication terminal are injected into the mold, and the housing is manufactured from the injected synthetic resins at the appropriate temperature and pressure. Therefore, the material that forms the carrier film 321 needs to a material that does not undergo significant deformation under the pressure and the temperature of the in-molding labeling, and at the same time, can be integrally formed with the housing of the mobile communication terminal. In this embodiment, the carrier film 321 may include a thin, insulating polymer material.

The conductive pattern 322 may be an antenna pattern that is formed on one surface of the carrier film 321. The conductive pattern 322 may be formed by using various kinds of methods. A conductive pattern may be printed onto the carrier film 321 by using conductive ink. Alternatively, a desired pattern may be directly formed on the carrier film by sputtering or evaporation. The conductive pattern 322 may be a conductive pattern that is formed of previously manufactured metal foil which is then attached to the carrier film 321. The conductive pattern 322 includes a power feed terminal, and may also include a connection terminal for making a connection to an external circuit, such as a ground terminal. In this embodiment, the power feed terminal may be a contact area that is in contact with the connector 340.

The connector 340 may be formed of a conductive material. One end of the connector may be disposed in contact with the conductive pattern 322.

FIG. 3B is a view illustrating a process of forming a housing by injecting into the mold, synthetic resins used to form the housing of the mobile communication terminal.

A housing 310 of the mobile communication terminal may be formed by the in-molding labeling. That is, the film type antenna 320 and the connector 340 are inserted into the mold for manufacturing the housing, and synthetic resins used to form the housing are injected into the mold, thereby manufacturing the housing. At this time, the film type antenna 320 maybe formed integrally with the housing 310 and be formed on the surface of the housing, and part of the connector 340 may be inserted into and fixed to the housing.

In this embodiment, the film type antenna 320 may be formed on an outer surface of the housing 310. In order to support the connector 340, a protrusion 311 may be formed on the housing 310.

FIG. 3C is a view illustrating a process of disposing a printed circuit board 330 inside the housing and connecting the connector 340 to the printed circuit board.

One end of the connector 340 may be inserted into a via hole that is formed in the printed circuit board, and the connector may be connected to a power feed line on the printed circuit board by soldering, which is performed at the rear surface of the printed circuit board. The soldering allows an electric connection between the connector and the printed circuit board, and strengthens physical coupling therebetween.

In FIG. 3C, only a part of the housing is illustrated. However, a housing corresponding to the housing 310 is coupled to manufacture the mobile communication terminal.

As set forth above, according to the exemplary embodiments of the invention, a stable contact can be provided between a film type antenna formed on a housing of a mobile communication terminal, and a printed circuit board inside the housing.

While the present invention has been shown and described in connection with the exemplary embodiments, it will be apparent to those skilled in the art that modifications and variations can be made without departing from the spirit and scope of the invention as defined by the appended claims.

What is claimed is:

1. A mobile communication terminal comprising:
   a housing having a surface;
   a film type antenna provided on the surface of the housing;
   a printed circuit board disposed inside the housing; and
   a connector supported tightly and firmly by the housing and electrically connecting the film type antenna and the printed circuit board,
   the connector being integrally formed with the housing by in-molding labeling, and a portion of the connector being inserted inside the housing.

2. The mobile communication terminal of claim 1, wherein the film type antenna is provided integrally with the housing by in-molding labeling.

3. The mobile communication terminal of claim 1, wherein the connector comprises:
   a first contact part in contact with the film type antenna;
   a second contact part connected to the printed circuit board; and
   a support part provided between the first contact part and the second contact part and supporting the connector with respect to the housing.

4. The mobile communication terminal of claim 3, wherein the first contact part comprises a bent portion to provide elasticity.

5. The mobile communication terminal of claim 3, wherein the second contact part passes through a via hole formed in the printed circuit board, and is connected to one surface of the printed circuit board opposite to another surface facing the film type antenna by soldering.

6. The mobile communication terminal of claim 3, wherein the support part comprises:
   a first support portion connecting the first contact part and the second contact part; and
   a second support portion extending from the first support portion.

7. The mobile communication terminal of claim 6, wherein the first support portion is perpendicular to a major surface of the printed circuit board.

8. The mobile communication terminal of claim 6, wherein the second support portion is horizontal to a major surface of the printed circuit board.

9. The mobile communication terminal of claim 3, wherein the housing comprises a protrusion to support the support part.

10. A mobile communication terminal comprising:
    a housing of the mobile communication terminal;
    a film type antenna provided on a surface of the housing;
    a printed circuit board disposed inside the housing; and
    a connector electrically connecting the film type antenna and the printed circuit board,
    wherein the connector comprises:
    a first contact part in contact with the film type antenna;
    a second contact part connected to the printed circuit board; and
    a support part provided between the first contact part and the second contact part and supporting the connector with respect to the housing,
    wherein the support part comprises:

a first support portion connecting the first contact part and the second contact part; and a second support portion extending from the first support portion.

11. The mobile communication terminal of claim 10, wherein the first support portion is perpendicular to a major surface of the printed circuit board.

12. The mobile communication terminal of claim 10, wherein the second support portion is horizontal to a major surface of the printed circuit board.

13. A method of manufacturing a mobile communication terminal, the method comprising:

inserting a film type antenna into a mold for forming a housing of the mobile communication terminal;

inserting a connector into the mold, the connector being electrically connected to the film type antenna; and injecting a resin into the mold for forming the housing integrally with the connector, at least a portion of the connector protruding through a wall of the housing.

14. The method of claim 13, further comprising:

connecting a printed circuit board to the connector.

15. The method of claim 14, wherein said connecting comprises:

inserting an end of the portion of the connector through a via hole formed in the printed circuit board; and soldering the connector with the printed circuit board.

* * * * *